UNITED STATES PATENT OFFICE.

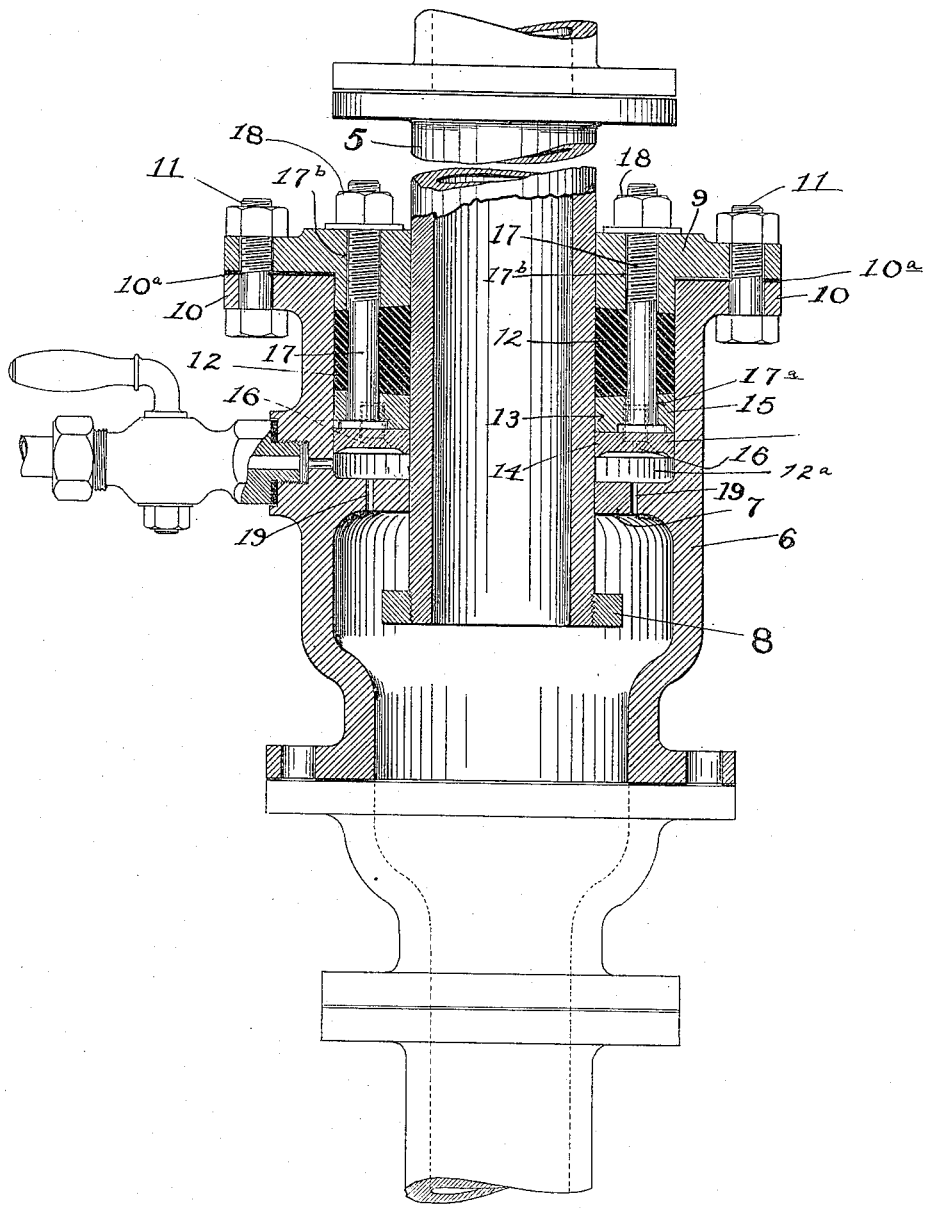

TOBIAS MILLER, OF YOUNGSTOWN, OHIO.

EXPANSION-JOINT.

1,163,941.  Specification of Letters Patent.  Patented Dec. 14, 1915.

Application filed January 20, 1913. Serial No. 743,220.

*To all whom it may concern:*

Be it known that I, TOBIAS MILLER, a subject of the Emperor of Austria-Hungary, residing at Youngstown, in the county of Mahoning and State of Ohio, have invented a new and useful Expansion-Joint, of which the following is a specification.

This invention relates to new and useful improvements in expansion joints of the type which are especially useful in connection with steam pipes.

The principal object of this invention is to provide a joint which will not only compensate for the expansion and contraction of the pipe line, but which will also be automatically maintained non-leakable.

Another object of the invention is to provide a joint of the character described in which the parts are so arranged that the packing may be readily positioned or removed when ever desired.

With these and many other objects in view which will more readily appear as the description of the invention proceeds, the same consists in the novel combination, construction and arrangement of parts hereinafter more fully described, illustrated and claimed.

In the accompanying drawing, the figure is a longitudinal sectional view through a pipe joint constructed in accordance with my invention.

Referring to the embodiment shown, the numerals 5 and 6 respectively designate the pipe and casing members of the joint, the same having a relative longitudinal sliding movement to take care of the expansion and contraction in the pipe line. The member 5 is disposed within and in spaced relation to the member 6, and extending inwardly from the member 6, at a point between the ends, is an internal flange 7. This flange snugly receives the pipe member 5 and forms a guiding bearing therefor, and the inner end of the pipe is normally disposed in spaced relation to said flange 7, and has secured thereto a stop element 8, preferably consisting of a threaded ring. The stop or ring 8 and the flange 7 coöperate to limit relative longitudinal movement of the joint members 5 and 6.

The outer end of the casing 6 is closed by a cap 9 detachably secured thereto. Although this cap may be secured in any suitable manner, I preferably form the casing with a lateral flange 10 which receives a plurality of cap-fastening bolts 11 or other suitable fastening means. The joint between the cap and the flange 10 of the casing is sealed by a gasket or insulator 10$^a$ to maintain a steam and fluid tight joint at this point.

In order to automatically expand the packing 12, by steam pressure, against the pipe 5 and thereby positively prevent the joint from leaking, I have provided a novel piston ring which is disposed in a chamber 12$^a$ between the members 5 and 6, and between the flange 7 and said packing 12. In this instance, the piston ring, designated as the whole by the reference numeral 13, is preferably of a two-part construction, one part 14 being made of copper and the other part 15 being made of harder metal, such as steel or the like. These parts or rings are detachably secured together in ground engagement by means of screws 16 or the like. The ring 15 which is of the harder metal is disposed against the packing 12, and the ring 14 which is of copper is disposed in position to be acted upon by the steam within the pipes so as to make a tight fit when heated and under pressure.

In order to retain the piston ring in spaced relation to the flange 7, and also to permit of said ring moving away from said flange and against the packing, I have provided a guiding means therefor, preferably consisting of a plurality of bolts 17 connected to the piston ring by being passed through suitable openings 17$^a$ formed in the ring 15. The threaded ends of the bolts freely extend through openings 17$^b$ formed in the cap 9, and nuts 18 or other adjusting means are engaged with the exterior projecting ends of said bolts.

In order to permit steam to exert pressure against the piston ring, I have provided the flange 7 with a plurality of ports 19 which communicate with the interior space or chamber 12$^a$ and the open part of the casing.

In assembling this joint, the pipe 5 is first inserted within the casing 6 and the stop ring 8 is secured to the inner end of the pipe. The guiding means or bolts 17 are then passed through the ring 15, and the ring 14 is then secured to the ring 15. The packing 12 is then inserted between the members 5 and 6, and the cap 9 attached to the member 6, the outer ends of the bolts 17 of course, being passed through their respective openings in said cap. In practice, it will be observed that steam will pass through the ports 19 and bear directly against the copper ring 14 of said piston ring, and thereby cause the packing 12 to be expanded against the walls of both the members 5 and 6 and consequently preventing the steam from escaping through the joint.

From the foregoing it will be observed that I have provided an extremely simple joint which will compensate for the contraction and expansion in the pipe line; that the piston ring carries guiding means therefor, and that both the piston ring and guiding means are adapted to be inserted or removed together; and that this joint is constructed to provide an automatic means for expanding the packing to render the joint non-leakable regardless of the amount of steam pressure.

I claim:

1. An expansion joint for steam pipes comprising a pipe member and a casing member telescopically receiving the pipe member and spaced therefrom to provide an intervening packing space, said casing member being provided with an interior flange closely receiving the pipe member and having steam ports in communication with the passageway through the joint, a cap for closing one end of the casing member and having unthreaded bolt openings therein, an expansible and compressible packing material confined in said packing space, a sliding piston ring mounted inside of the packing space and bearing against the packing material therein, and a series of bolts slidably mounted in the bolt openings of the casing cap and having their inner head portions interlocked and housed within said sliding piston ring.

2. An expansion joint for steam pipes comprising a pipe member, a casing member telescopically receiving the pipe member and spaced therefrom to provide an intervening packing space, packing material within said space, a piston arranged to bear against the packing material and consisting of a pair of separably connected ring members respectively of hard and soft metal, and bolts slidably extending through one end of the casing member and having their heads clamped between the two ring members of said piston.

TOBIAS MILLER.

Witnesses:
 F. W. CUMMER,
 B. E. BOWLUS.

Copies of this patent may be obtained for five cents each, by addressing the "Commissioner of Patents, Washington, D. C."